United States Patent [19]
Chase et al.

[11] Patent Number: 5,714,763
[45] Date of Patent: Feb. 3, 1998

[54] METHOD AND APPARATUS FOR OPTICAL ALIGNMENT OF A MEASURING HEAD IN AN X-Y PLANE

[75] Inventors: Lee Chase, Los Gatos; John Goss, San Jose; Mark Alguard, Palo Alto; Steve Axelrod, Los Altos; Peter Herzlinger, Los Gatos; Len Anderson, San Jose; Harriss King, Cupertino, all of Calif.

[73] Assignee: Measurex Corporation, Cupertino, Calif.

[21] Appl. No.: 620,952

[22] Filed: Mar. 25, 1996

[51] Int. Cl.⁶ .................................................. G01N 21/86
[52] U.S. Cl. ...................... 250/559.3; 250/548; 356/429
[58] Field of Search ...................... 250/559.3, 559.26, 250/559.31, 559.38, 548; 356/375, 429, 399–401

[56] References Cited

U.S. PATENT DOCUMENTS 5,654,554  8/1997  Feller et al. .................................. 356/240

*Primary Examiner*—Que Le
*Attorney, Agent, or Firm*—Burns, Doane, Swecker & Mathis LLP

[57] ABSTRACT

A two-dimensional position detector, in combination with dynamic z and/or flutter sensors, provides dynamic misalignment detection and correction of a measuring head, thereby allowing accurate determinations to be made of properties of a sheet material, such as basis weight.

15 Claims, 4 Drawing Sheets

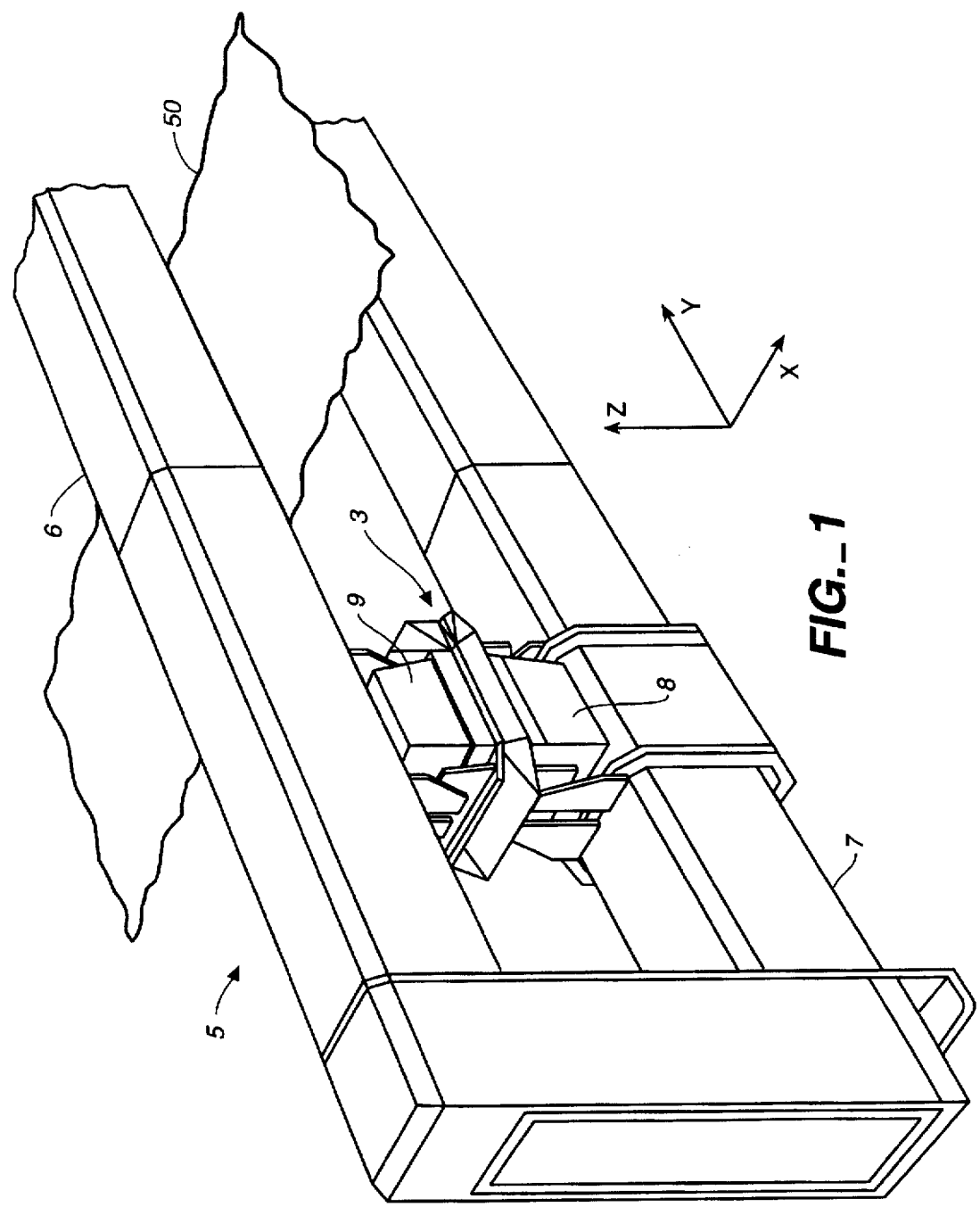
FIG._1

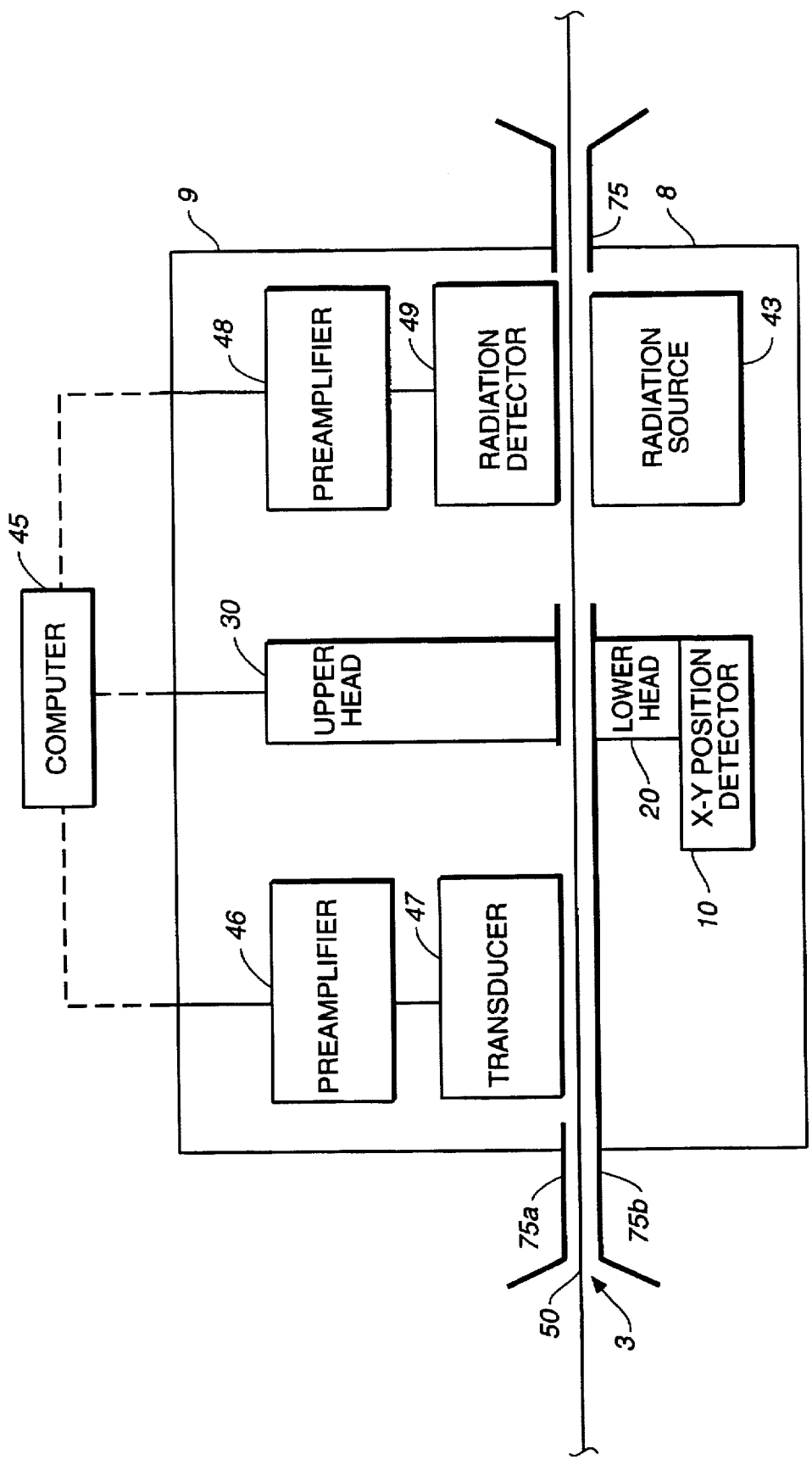
FIG._2

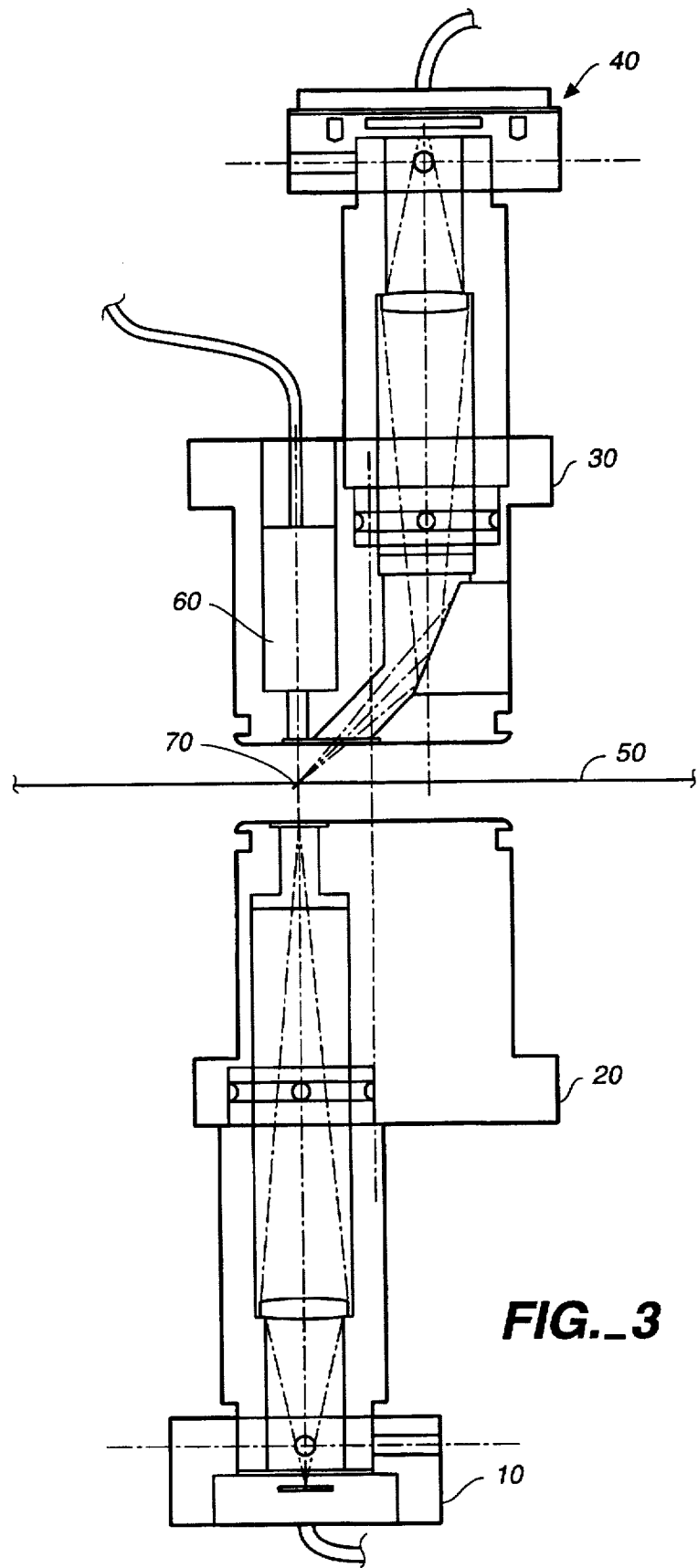
FIG._3

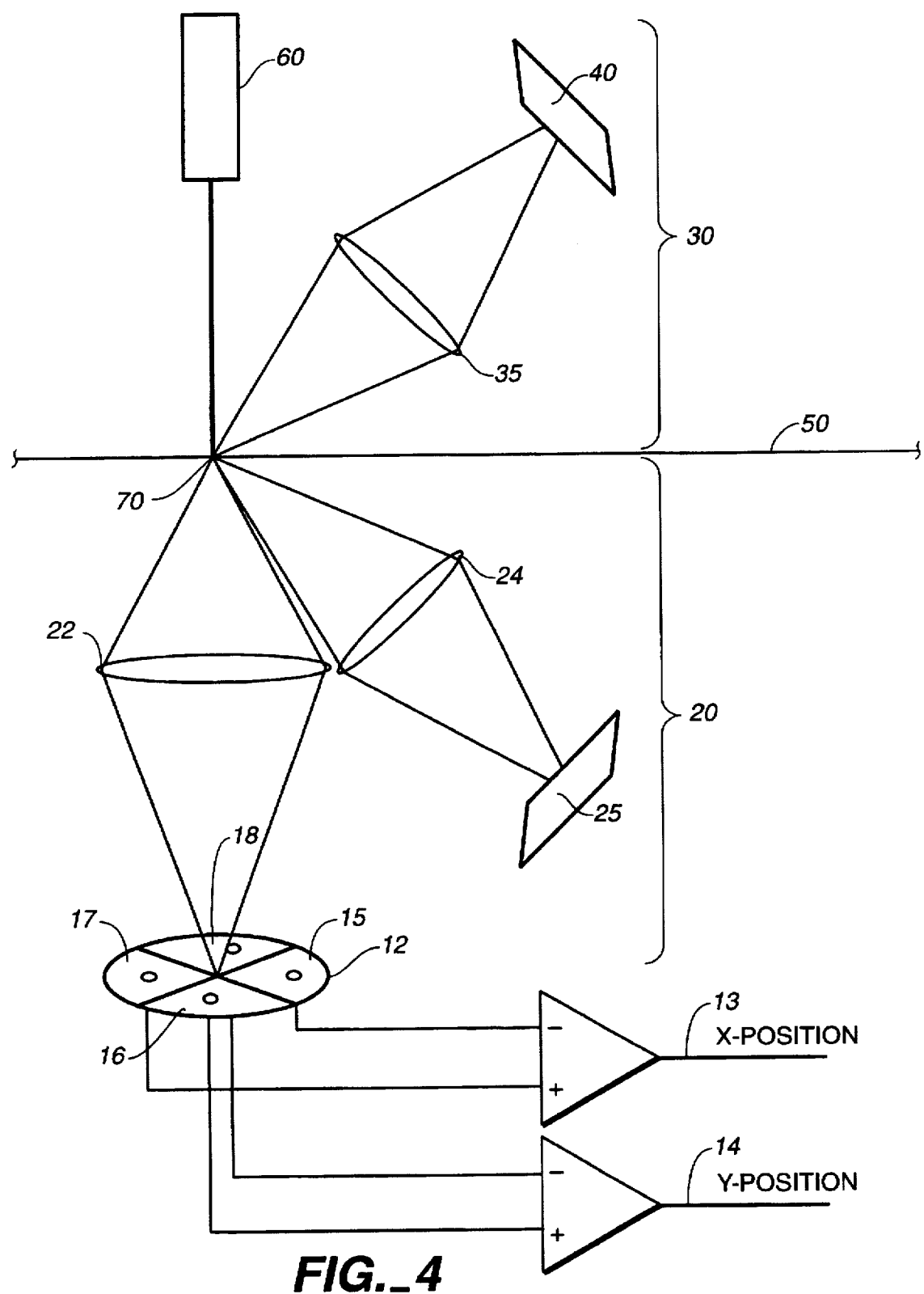
FIG._4

METHOD AND APPARATUS FOR OPTICAL ALIGNMENT OF A MEASURING HEAD IN AN X-Y PLANE

BACKGROUND OF THE INVENTION

1. Field of the Invention

The present invention generally relates to measurement systems for determining parameters of continuous sheet materials during production and, more particularly, to systems and techniques for correcting sensor measurement while scanning continuous sheet materials.

2. State of the Art

It is well known to make on-line measurements of properties of continuous sheet materials during manufacture. The purpose of on-line measurements, generally speaking, is to enable monitoring of sheetmaking processes with the goal of enhancing sheet quality while reducing the quantity of substandard sheet material which is produced before undesirable process conditions are corrected. In practice, most sheetmaking machines have been instrumented to include on-line sensors. In the paper making art, for instance, on-line sensors detect variables such as basis weight, moisture content, and caliper of sheets during manufacture.

On-line measurements during the production of continuous sheet materials are, however, difficult to make accurately. The primary factor affecting the accuracy of on-line measurements is the fact that many sheetmaking machines are large and operate at high speeds. For example, some paper-making machines produce sheets up to four hundred eighty inches wide at rates of up to one hundred feet per second. Another factor affecting on-line measurements is that physical properties of sheet materials can vary across the width of a sheet and can vary differently in the machine direction than in the cross direction. (In the sheetmaking art, the term machine direction refers to the direction of travel of a sheet during manufacture, and the term cross direction refers to the direction across the surface of a sheet perpendicular to the machine direction.)

To detect cross-directional and machine directional variations in continuous sheet materials during production, it is well known to use on-line scanning sensors that periodically traverse back and forth across a sheetmaking machine in the cross direction. Typically, measurement information provided by a scanning sensor is assembled to provide, for each scan, a profile of the detected property of the sheet. Thus each profile, such as a basis weight profile, is comprised of a succession of sheet measurements at adjacent locations extending generally in the cross direction. Based upon the profile measurements, sheet property variations can be detected. Based upon the profiles, process controls may be adjusted with the goal of providing uniform cross-directional profiles, i.e., profiles that have constant amplitude in the cross direction, or conform to other cross-directional profile targets as desired.

FIG. 1 depicts one example of an on-line scanning sensor system 5 that periodically traverses (i.e., scans) back and forth across a sheetmaking machine in the cross direction to detect variations in the continuous sheet materials during production. In the system 5, housings 8 and 9 are mounted on opposite sides of a moving sheet 50 (i.e., above and below the sheet) for movement across the sheet 50 to measure a selected sheet parameter. A gap 3 is formed between the upper and lower housings 8 and 9 so that the sheet 50 can be disposed in the gap 3. In operation of the scanning system, the housings 8 and 9 travel synchronously across the sheet on track means (not shown) that are mounted to the parallel horizontal frame members 6 and 7, respectively. The direction of sheet travel (i.e., machine direction) can be understood to be the x-direction, and the scanning direction (i.e., cross-direction) can be understood to be the y-direction. The direction perpendicular to the plane of the travelling sheet is designated as the z-direction.

In practice, the housings 8 and 9 serve as platforms for carrying sensors to detect sheet properties, such as basis weight. So, for example, the first housing 8 may carry a radiation source, such as a nuclear beta source, and the second housing 9 may carry a detector. In this case, the sensors can be employed to make basis weight measurements by measuring the radiation intensity incident on the detector when a sheet is present as compared to the beta radiation which is incident upon the detector, when no sheet is present; that is, the basis weight is measured by the beta radiation attenuated by the sheet material. It is well known that such a scanning sensor system is susceptible to various errors. For example, if the vertical distance separating the housings 8 and 9 does not stay constant during a scan, the incident radiation intensity will vary independently of variations in sheet properties. (In practice, errors arising from such variations are sometimes referred to as z-direction errors.) Similarly, if the housings 8 and 9 do not stay exactly aligned in the x and y directions during scanning, the incident radiation intensity will vary independently of variations in sheet properties. Likewise, the incident radiation intensity will vary if the sheet position in the z-direction is not stable. Such variations in sheet position, often referred to as flutter, are caused by waving or fluttering of, the sheet material. As suggested by the name, fluttering can occur rapidly. Sheet flutter, like variations in the relative positions of the radiation source and sensor, can cause the radiation intensity detected at the detector to vary independently of sheet properties, causing measurement inaccuracies unless compensations are made.

Various techniques have been used to correct for sensor positional errors (i.e., misalignment) and for sheet flutter. For example, it is known to use a profile correction array to correct for misalignment of measurement heads. The array is created by fixing a stable sample of a known basis weight to a basis weight sensor, and scanning the sample while the sheet material is not present. The measured weight is then compared to the actual weight of the sample to determine any error. This process is repeated at each location across the scan area and each result is saved in a profile correction array. This array is then used to correct the basis weight readings for the sheet material. This technique has various shortcomings, one of which is that it provides accurate measurements only so long as the error for each location remains constant.

Other techniques used to measure misalignments between the upper and lower housings in the x-y plane involve the use of a magnetic coupling, such as the measurement of field strength in balanced Hall Effect probes or induced fields in pickup coils. Although these techniques are relatively accurate, they are typically difficult to calibrate, inherently non-linear, and relatively expensive.

It also is known to make z-direction measurements with laser triangulation systems or eddy current transducers to correct for the positional errors in the distance (i.e., air column length) separating a radiation source and detector. Because the error corrections are continuously available, this technique is sometimes referred to as dynamic z-direction correction. The advantage of the dynamic z-direction correction technique over the profile correction array technique is that the former permits correction of errors caused by changes in alignment to be made in real time. However, because the dynamic error correction technique only compensates for dynamically changing errors in the z-axis, a profile correction array is still used for misalignment in the x-y plane.

SUMMARY OF THE INVENTION

The present invention, generally speaking, provides dynamic detection of head misalignments along the x, y and z axes. Further, the present invention provides correction on a real time basis of sensor measurement errors due to head misalignments as well as sheet flutter. In practice, the present invention provides a miniaturized and inexpensive sensor measurement and correction methods for use on-line during production of continuous sheet manufacturing.

Exemplary embodiments of the present invention employ a two-dimensional position detector, in combination with dynamic z and/or flutter sensors, for making dynamic misalignment detection and correction of a measuring head, thereby allowing accurate determinations to be made of properties of a sheet material, such as basis weight.

In one exemplary embodiment of the present invention, a light source, such as a laser, is provided for radiating a spot on the first side of a sheet material. A two-dimensional position detector is placed on a second side of the sheet material, opposite the first side. An image of the laser spot is then focused onto the position detector to determine head misalignment in the x-y plane.

Misalignments in the x-y plane can be converted into offset values for correcting output of the detector, such as the radiation detector, for measuring a parameter of the sheet. The x-y misalignment can be used in conjunction with other sensors, such as the dynamic z sensor and/or a flutter sensor, to offset the output from the detector used to measure a parameter of the sheet. Thus, an accurate measurement of the parameter can be provided.

In accordance with another exemplary embodiment of the present invention, rather than using an x-y misalignment position detector in conjunction with a separate dynamic z sensor and/or flutter sensor, position detector can be used to provide a flutter sensor measurement. For example, known triangulation measurements of a spot produced by a light source of the x-y misalignment position detector can be used to determine a distance between a first head located on one side of the sheet, and between a second head locator on a second side of the sheet opposite the first side. By determining the sum of these two distances, the total distance between the first and second heads can be provided if sheet caliper is known. In accordance with another exemplary embodiment of the invention, a distance between the upper and lower housings can be measured through use of an eddy current transducer.

BRIEF DESCRIPTION OF THE DRAWINGS

The preceding and other advantages of the present invention will be understood by referring to the following description and appended drawings wherein like elements have been designated with like reference numerals, and in which:

FIG. 1 shows a scanning system in accordance with an exemplary embodiment of the present invention;

FIG. 2 is a schematic illustration of a portion of the FIG. 1 scanning system;

FIG. 3 depicts position sensors in a scanning device in accordance with an exemplary embodiment of the present invention; and FIG. 4 shows an exemplary embodiment of a position sensing device in accordance with an exemplary embodiment of the present invention.

DETAILED DESCRIPTION OF THE PREFERRED EMBODIMENTS

In the exemplary system in FIG. 2, housings 9 and 8 include a sensor system comprising radiation source 43 and a radiation detector 49, respectively. The radiation source emits radiation which passes through the paper 50. Preferably the radiation source emits beta radiation, but sources that emit alpha, gamma, or x-ray radiation can be employed. The radiation detector 49 receives radiation from the source 43 and produces an electrical signal in response to the quantity of incident radiation. A pre-amplifier 48 receives the signals from the detector 49, amplifies the signals, and transmit them to a variable frequency counter, the counts of which are read by a counter and provided to a computer 45.

The housings 8 and 9 also include a distance sensing means, such as a transducer 47, affixed to the upper housing 9 and a reference means, such as a reference plate, affixed to the lower housing 8. In operation, the transducer 47 moves with a head of the upper housing at a distance spaced apart from the lower housing 8. Preferably, the transducer 47 is located near the face 75a of the upper head so that the distance to the lower housing 8 is minimized. Transducer 47 produces an electrical signal which is directly related to the distance between the transducer 47 and the reference means affixed to the lower housing 8. The transducer 47 is connected to a pre-amplifier 46 which, in turn, is connected to the computer 45.

The measurements provided by the above-described system can be compensated using the detected z-direction distance between the upper and lower heads as disclosed in U.S. Pat. No. 4,678,915, the disclosure of which is hereby incorporated by reference. While the above-mentioned system can accurately measure z-direction displacement in the z direction, it does not compensate for sheet flutter or for misalignment of the housings in the x and/or y directions. To provide compensation for misalignment in the x-y plane, an x-y misalignment detector having a two-dimensional x-y position detector 10 placed, for example, in the lower housing 8 to accurately measure the x and y displacement.

FIG. 2 shows an exemplary embodiment of the x-y misalignment detector which further includes two heads 20 and 30. The first upper head 30 is located in the upper housing 9 and the second lower head 20 is located in the lower housing 8. Of course, if desired, the locations of the upper and lower heads can be reversed.

An exemplary embodiment of the upper head 30, lower head 20 and x-y position detector 10 is shown in greater detail in FIG. 3. Referring to FIG. 3, mounted to the first head 30 is an energy source 60. In an exemplary embodiment, the energy source 60 is a light radiation source, such as a laser diode. A collimated beam from the laser diode is radiated through the translucent sheet material 50 and focused to produce a small spot 70 on a web of sheet material 50. In an exemplary embodiment, the incident beam from light source 60 is normal to the upper housing.

On a second side of sheet material, opposite the first side, is a second head 20 of the scanner. Mounted to the second head is a viewing optic normal to the z axis and arranged so that an image of the focused spot 70 appears on the optically sensitive x-y position detector 10.

Referring now to FIG. 4, the focused spot 70 can be optically aligned via a lens 22 included in the second head 20 to appear on a two dimensional position sensitive detector 12 of the x-y position detector 10. The position sensitive detector 12 can include any light sensitive device, such as a photocell divided into four quadrants. Quadrants 15 and 17 of the exemplary position sensitive detector 12 measure displacements of the focused spot in the x-axis, and quadrants 16 and 18 measure displacements along the y-axis. The centroid of the illuminated spot 70 is then determined through the relative quantity of light in the four quadrants using outputs of differential operational amplifiers 13 and 14. The position of the first and second heads relative to each other in the y-y plane can then be easily determined from the position of the focused spot 70. This position can be stored and referenced with respect to both the time and the location for which it was determined. Detected x-y misalignments can then be used to correct any measurements or calculations made for the sheet material at that location using the radiation detector 49 (FIG. 2).

In an exemplary embodiment, x-y position information from the x-y position detector can be input to the computer 45 (FIG. 2) and any corrections can be made in real time. Thus, misalignment of the first and second heads in the y-y plane can be determined, and correction of any measurements can be made.

The range of the sheet material thicknesses that can be used with the above-described techniques depends primarily on the material opacity and selected characteristics of the light source (for example, wavelength of the light output from the light source). For typical laser diodes, a useable signal can be obtained for paper up to several hundred grams per square meter. Provided an illuminated spot can be determined on the opposite side of the one that is being radiated, the x-y position can be determined. Further, the arrangement will work even if the sheet is removed, provided the detector does not saturate.

Through use of an x-y detector arrangement as described above, an inexpensive determination of x-y misalignment can be dynamically determined during measurement of the sheet material. Exemplary embodiments are far less bulky and expensive than conventional techniques, without sacrificing accuracy of the measurements. The above system can be used to compensate basis weight or other parameters of paper sheet material.

In accordance with the exemplary embodiment described above, an x-y misalignment position detector is used to provide an offset value for the output from the radiation detector 49. The exemplary FIG. 2 embodiment further included a transducer 47 for providing a dynamic z-axis compensation value as an offset for the value produced from the output of radiation detector 49. Thus, the exemplary FIG. 2 embodiment uses the x-y position detector and the transducer 47 to compensate the output from the radiation detector 49. Further, if flutter corrections are to be provided (e.g., to account for movements of the sheet 50 in the z-direction during its movement), a separate flutter detector can be provided, in addition to the transducer 47 and x-y misalignment position detector.

However, in accordance with one variant of the present invention, the spot imaged onto the sheet of material by the upper head 30 can be used to provide both dynamic z-axis correction and a flutter correction. For example, referring to the exemplary FIG. 4 embodiment, the spot imaged onto the material 50 by the laser diode 60 can be detected by both the upper head 30 and by the lower head 20 to provide distances between the upper head and a first side of the sheet 50, and between the lower head and a second opposite side of the sheet 50. The total of these two distances can then be used as a measure of total distance between the upper head 30 and the lower head 20 of caliper of the sheet is known.

Further, the position of the spot on the sheet can be monitored, with changes in this position being used to represent sheet flutter. For example, as the sheet 50 moves closer to the upper head 30, the position of the spot 70, as imaged onto a linear position sensor 40 via a lens 35 changes position. This change in position can be correlated, through the use of a triangulation measurement to a movement of the sheet in the z-axis. A similar change in position of the focused spot on a linear position sensor 25 can be used in providing the measurement of flutter using triangulation. As with the imaging of the spot 70 on the linear position sensor 40, the spot 70 can be imaged via a lens 24 on the linear position sensor 25. The second sensor 25 is used to provide a flutter reference value to ensure that changes in the position of the spot on detector 40 are not due to changes in sheet thickness.

Outputs from the linear position sensors 25 and 40 can be supplied to the computer 45 of FIG. 1, and used therein to provide a calculation of a flutter measurement using conventional triangulation measurements. That is, a fixed relationship exists between the laser diode 60 and sensor 40. Further, a fixed relationship exists between the x-y position detector 12 and sensor 15. Thus, by detecting positional changes of the focused spot on sensors 25 and 40, in conjunction with the z-axis detector output, triangulation can be used to measure sheet flutter. This flutter measurement can, in known fashion, be used in conjunction with a look-up table to offset the values produced by the radiation detector 49, and thereby improve the accuracy of the sheet parameter measured by the exemplary FIG. 2 system.

The present invention has been described by way of example, and modifications and variations of the exemplary embodiments will be apparent to skilled artisans in this field without departing from the spirit of the invention. The preferred embodiments are merely illustrative and should not be considered restrictive in any way. The scope of the invention is to be measured by the appended claims, rather than the preceding description, and all variations and equivalents which fall within the range of the claims are intended to be embraced therein.

What is claimed is:

1. A system for dynamic measurement of head alignment comprising:
   a first head means for radiating a spot on a first side of a sheet material located on a first plane;
   a second head means positioned on a second side of the sheet material, opposite said first side, for focusing an image of the spot onto a two dimensional optical position sensitive detector; and
   means for determining misalignment between the first head means and the second head means in response to the position of said image on said optical position sensitive detector.

2. A system according to claim 1, said first means further comprising a laser for radiating said spot.

3. A system according to claim 2, wherein an optical axis of both the laser and detector are arranged perpendicular to the first plane.

4. A system according to claim 1, further comprising a means for determining sheet position from a triangulation measurement using said spot.

5. A system according to claim 4, further comprising a means for measuring a separation distance of the upper and lower heads with an eddy current transducer.

6. A system according to claim 1, further comprising means for determining head alignment error from said determination of said misalignment.

7. A system according to claim 5, further comprising means for basis weight error of the sheet material from said determination of said misalignment, said separation distance and sheet position.

8. A system according to claim 7, further comprising means for determining basis weight of the sheet material compensated for said determined basis weight error.

9. A method for dynamic measurement of head alignment with head alignment error determination for use in a system having a first and second head arranged on opposite sides of a sheet material traveling past the heads comprising the steps of:
   radiating a spot on a first side of a sheet material;
   focusing an image of said spot onto a two dimensional optical position sensitive detector arranged opposite said first side; and
   determining a misalignment between the first and second head means in response to the image position.

10. A method according to claim 9, further comprising the step of providing a laser for radiation said spot.

11. A method according to claim 9, further comprising the steps of:
   determining a sheet position from a triangulation measurement;
   in conjunction with a caliper measurement, determining a separation distance of the first and second heads by; and
   determining a basis weight error of the sheet material based on said misalignment, said separation, and said sheet position.

12. A method according to claim 11, further comprising the step of determining a basis weight for the sheet material compensated for said basis weight error.

13. A system for dynamic measurement of head alignment in three dimensions with head alignment error determination on a real time basis comprising:
   a first head means including a laser for radiating a spot on a first side of a sheet material in a first plane;
   a second head means positioned on a second side of the sheet material, opposite said first side, for focusing an image of the laser spot onto a two dimensional optical position sensitive detector, wherein an optical axis of both the laser and detector are arranged perpendicular to the first plane;
   means for determining a misalignment between the first head means and the second head means in response to the image position;
   means for determining sheet position from a triangulation measurement using the laser spot;
   means for measuring a separation distance of the upper and lower heads with an eddy current transducer; and
   means for determining head alignment error from said determination of said misalignment, said separation distance and said sheet position.

14. A system for correcting sensor measurements in determining parameters of sheet material in three dimensions comprising:
   a first head means including a laser for radiating a spot on a sheet material in an x-y plane;
   a second head means positioned on a second side of the sheet material for focusing an image of the laser spot onto a two dimensional optical position sensitive detector, wherein the optical axis of both the laser and detector are arranged perpendicular to the x-y measurement plane of the sheet material;
   means for determining the x-y misalignment between the heads based on the image position;
   means for determining sheet position from triangulation measurement of the laser spot;
   means for determining z alignment by measuring separation of the upper and lower housings with an eddy current transducer;
   means for determining sheet material basis weight error from said determination of x, y and z alignment and sheet position; and
   means for determining basis weight of the sheet material compensated for basis weight error.

15. A system for sheet material basis weight determination with compensation for head misalignment and sheet flutter comprising:
   a first head means including a laser for radiating a spot on a sheet material in an x-y plane;
   a second head means positioned on the opposite side of the sheet material for focusing an image of the laser spot onto a two dimensional optical position sensitive detector, wherein the optical axis of both the laser and detector are arranged perpendicular to the x-y measurement plane of the sheet material;
   means for determining the x-y misalignment between the heads based on the image position;
   means for determining sheet position from triangulation measurement of the laser spot;
   means for determining z alignment by measuring separation of the upper and lower housings with an eddy current transducer; and
   means for determining sheet material basis weight error from said determination of x, y, and z alignment and sheet position.

* * * * *